United States Patent [19]

Arnoldt

[11] Patent Number: 4,508,376
[45] Date of Patent: Apr. 2, 1985

[54] FLANGE TYPE DUCT JOINT ASSEMBLY AND SEAL ARRANGEMENT THEREFOR

[75] Inventor: Peter J. Arnoldt, Puce, Canada

[73] Assignee: Ductmate Industries, Inc., Pittsburgh, Pa.

[21] Appl. No.: 327,934

[22] Filed: Dec. 7, 1981

Related U.S. Application Data

[63] Continuation of Ser. No. 933,179, Aug. 14, 1978, , which is a continuation-in-part of Ser. No. 872,644, Jan. 26, 1978, Pat. No. 4,218,079.

[51] Int. Cl.³ ............................................ F16L 23/00
[52] U.S. Cl. ...................................... 285/363; 285/424
[58] Field of Search ................ 285/424, 363, 405, 364

[56] References Cited

U.S. PATENT DOCUMENTS

| | | |
|---|---|---|
| 565,499 | 8/1896 | Pattison ............................... 285/424 |
| 939,001 | 11/1909 | Forster et al. . |
| 1,035,810 | 8/1912 | Osborne . |
| 1,812,319 | 6/1931 | Brumfield . |
| 3,199,901 | 8/1965 | Jeppsson ............................. 285/364 |
| 3,246,918 | 4/1966 | Burghart .......................... 285/424 X |
| 3,630,549 | 12/1971 | Grimm ............................. 285/424 X |
| 3,695,636 | 10/1972 | Groves ............................. 285/424 X |
| 3,712,650 | 1/1973 | Mez .................................. 285/424 X |
| 3,923,326 | 12/1975 | Mez ..................................... 285/363 |
| 4,094,520 | 6/1978 | Rockaway et al. . |
| 4,123,094 | 10/1978 | Smitka ................................. 285/424 |
| 4,218,079 | 8/1980 | Arnoldt . |
| 4,288,115 | 9/1981 | Sullivan ............................... 285/363 |

FOREIGN PATENT DOCUMENTS

| | | |
|---|---|---|
| 1212356 | 3/1966 | Fed. Rep. of Germany ...... 285/364 |
| 2138966 | 2/1973 | Fed. Rep. of Germany ...... 285/424 |
| 2221312 | 11/1973 | Fed. Rep. of Germany ...... 285/424 |
| 2353625 | 11/1973 | Fed. Rep. of Germany . |
| 7401814 | 5/1974 | Fed. Rep. of Germany . |
| 2258680 | 6/1974 | Fed. Rep. of Germany ...... 285/424 |
| 2313425 | 9/1974 | Fed. Rep. of Germany ...... 285/424 |
| 2353325 | 3/1975 | Fed. Rep. of Germany ...... 285/424 |
| 2434160 | 1/1976 | Fed. Rep. of Germany ...... 285/424 |
| 2034005 | 5/1976 | Fed. Rep. of Germany ...... 285/424 |
| 2501611 | 7/1976 | Fed. Rep. of Germany ...... 285/424 |
| 2556167 | 6/1977 | Fed. Rep. of Germany ...... 285/424 |
| 2627515 | 12/1977 | Fed. Rep. of Germany ...... 285/424 |
| 1363255 | 5/1964 | France ................................. 285/424 |
| 1294859 | 11/1972 | United Kingdom . |
| 1346366 | 2/1974 | United Kingdom . |
| 1407796 | 9/1975 | United Kingdom . |

OTHER PUBLICATIONS

Smitka Advertisement, "Now You Can Reduce Your In-Place Cost of Duct Connections by 59%".

Primary Examiner—Dave W. Arola
Attorney, Agent, or Firm—Stanley J. Price, Jr.; John M. Adams

[57] ABSTRACT

A joint assembly for connecting the ends of a pair of generally rectangular sheet metal duct sections includes a pair of frame members secured to each other and connected to the respective duct end sections. The frame members each include four flange portions. Each flange portion has an upstanding channel shaped leg portion and an angularly extending duct receiving leg portion. A corner piece connects adjacent flange portions and extends into the channel portions of the upstanding leg portions to form the generally rectangular frame. The end portions of the ducts are inserted into longitudinal openings of the duct receiving leg portions. A flowing type gasket material is positioned longitudinally in the flanges in a longitudinal pocket formed between an inturned rebent portion and the upper horizontal surface of the bottom wall of the duct receiving leg portion. The end of each duct wall partially displaces the gasket material so that the gasket material extrudes outwardly around the upper and lower surfaces of the duct wall and between the ends of the flange portion and the corner piece. The surface of the corner piece flange portion is displaced from the front vertical wall of the upstanding channel shaped leg portion so that the edge of the duct extends beyond the flange portion and penetrates an outside gasket member positioned on the upstanding channel shaped leg portion and the corner piece. This provides an effective seal to prevent air within the duct from flowing around the end of the duct and between the outer surface of the duct and the surface of the flange portion of the corner piece.

7 Claims, 11 Drawing Figures

FLANGE TYPE DUCT JOINT ASSEMBLY AND SEAL ARRANGEMENT THEREFOR

CROSS-REFERENCE TO RELATED APPLICATION

This application is a continuation of application Ser. No. 933,179 filed Aug. 14, 1978, entitled "A Flange Type Duct Joint Assembly And Seal Arrangement Therefor" which is a continuation-in-part of U.S. application Ser. No. 872,644 filed Jan. 26, 1978 in the U.S. Patent Office and now U.S. Pat. No. 4,218,079 issued Aug. 19, 1980, now entitled "Flange Type Duct Joint Assembly".

BACKGROUND OF THE INVENTION

1. Field of the Invention

This invention relates to a joint assembly for sealingly connecting the ends of a pair of sheet metal duct sections and more particularly to a joint assembly that includes a pair of frame members having flange portions secured to each other by angular corner pieces having rearwardly curved or displaced flange portions operable to facilitate an air-tight seal between the ends of the duct sections and the frame members.

2. Description of the Prior Art

U.S. Pat. No. 3,712,650 discloses a flange connection for connecting the ends of rectangular air conditioning ducts that includes flange portions each having a horizontal leg portion secured to the end portion of the duct and a vertical channel shaped leg for receiving the arm of an angular corner piece. A wall of the horizontal flange portion has a sloping intermediate portion that permits visual access to the bend areas between the adjacent walls of the duct and ends of the duct walls.

The angular corner pieces have arm portions which each extend into an opening in the vertical channel shaped flange. The arm portions are so dimensioned vertically that the lower surface of each arm abuts the lower wall of the horizontal flange. With this arrangement the end of the duct wall abuts or rests against the surface of the corner piece arm extending into the channel shaped opening.

Another joint assembly for connecting the ends of a pair of ducts is disclosed in German application No. P 25 56 167 filed Dec. 13, 1975, and includes a plurality of flange portions secured to the ends of the ducts and angular corner pieces positioned in vertically extending channel shaped openings in the respective flange portions to form a generally rectangular frame secured to the ends of the ducts. The flange portions each have a generally horizontal duct receiving leg and a vertical channel shaped leg. The duct receiving leg portion has a longitudinal opening for receiving the duct end wall and one wall of the vertically extending channel shaped leg has an inturned or inwardly rebent portion that forms a longitudinally extending lip spaced from the lower wall of the horizontal duct receiving leg. The duct end portion is arranged to extend into the space between the longitudinally extending lip and the lower wall of the horizontal duct receiving leg. In position, the duct end wall abuts the inner surface of the outer vertical wall of the upstanding channel shaped leg. The arm of the corner piece is arranged to extend into the opening above the inturned lip so that the corner piece arm portion is spaced from the duct end wall by the inturned lip portion. The corner pieces have arms with a curved configuration so that pairs of facing arms in adjacent frames are intended to exert a joinder pressure on the respective frame when the corner pieces are bolted to each other.

In the above joint assemblies, the duct end walls abut either the arms of the corner pieces or abut the inner surface of the frame channel shaped leg portion outer vertical wall. Where the end of the duct wall rests against the arm of the corner section, a space is provided between a substantial portion of the outer vertical wall of the channel shaped leg and the end of the duct wall. Where the end of the duct wall is positioned in the space between the inturned lip and the horizontal bottom wall, the duct end wall abuts a portion of the vertical wall of the frame section between the lip and the horizontal bottom wall. In either instance, irregularities on the surface of the duct or on the surface of the frame portions permit leakage of air from the duct through the flange connection. Positioning gasket material on the outer surface of the frame portions does not eliminate this air leakage since the leakage is occurring within the frame portions and around the duct end wall.

In German Offenlegungschrift No. 2,221,312 published Nov. 15, 1973 a fibrous gasket material is disclosed as positioned between the upper surface of the duct end portion and the under surface of the inturned rebent portion. French Pat. No. 1,363,255 discloses two pieces of sheet metal joined by a fold arrangement with a sealant engaged to the edge of one of the metal sheets. U.S. Pat. No. 3,246,918 discloses a flange connection in which sealing is achieved by the penetration of an end of a duct into a mastic.

One problem encountered with the joint assemblies of the prior art is the inability to form an air-tight seal around the duct end wall positioned oppositely of the vertical wall of the frame section adjacent the horizontal bottom wall of the frame section.

One proposed solution to this problem, as disclosed in the German OLS referred to above, is positioning a longitudinally extending gasket in the longitudinal space between the inturned rebent portion and the lower wall of the horizontal duct receiving leg. If when the duct end wall is inserted in the duct receiving leg portion, the gasket material is rolled up against the inner surface of the vertical wall of the channel shaped leg portion, an incomplete seal is formed around the end of the duct and the inner surface of the bottom wall of the duct receiving leg portion. Consequently, the end of the duct is substantially spaced from the inner vertical wall of the channel shaped leg portion. An air space is thus formed between the outside gasket on the outer surface of the frame portions and the duct edge because the outside gasket rests on the corner pieces and does not contact the duct edge. This permits air from the duct to flow around the end of the duct and between the outside surface of the duct and the under surface of the corner piece. Thus, air leaks from the ducts at the corners of the frame connecting the ducts.

There is need for a joint assembly that provides an effective corner seal between the duct end wall and the corner pieces that connect the adjacent flanges that form the joint frame. While it has been suggested by the prior art joint assemblies to utilize a longitudinally extending gasket in the flange portions to form a seal around the duct end portion in the flange portions, the gasket inside the flange portions does not prevent leakage around the corner pieces adjacent the ends of the flange portions. In addition, even with the use of an outside gasket on the corner pieces, unless the edge of the duct abuts the inner surface of the vertical wall of the flange portion, the outside gasket does not contact the end of the duct and air will leak around the end of the duct and between the duct and the corner piece beneath the outside gasket.

SUMMARY OF THE INVENTION

In accordance with the present invention there is provided a flange type duct joint assembly to connect the end portions of generally rectangular ducts or duct sections that includes a plurality of flange portions or duct connecting flanges. A plurality of angular corner pieces are provided for connecting adjacent flange portions to form a generally rectangular frame. The flange portions each have an upstanding channel shaped leg portion or upstanding corner piece receiving portion and a duct receiving leg portion or duct receiving portion. The upstanding channel shaped leg portion includes a front wall and a rear wall forming a corner piece receiving opening therebetween. The duct receiving leg portion includes a top wall and a bottom wall arranged to receive an end portion of a duct therebetween. The upstanding channel shaped leg portion front wall intersects the duct receiving leg bottom wall. The corner pieces each have a body portion or corner section and a pair of legs extending angularly therefrom. The corner piece corner section and the legs have a common front planar surface portion and a common rear planar surface portion. The pair of legs are arranged to extend into the corner piece receiving openings of the flange portion upstanding channel shaped leg portions. The corner piece body portion includes a corner portion having a flange portion or offset corner portion extending from the body portion. The corner section flange portion is in juxtaposition with the upstanding channel shaped leg portion where the front wall of the upstanding channel shaped leg portion intersects the bottom wall of the duct receiving leg portion. The corner section flange portion has a front surface and a rear surface. The flange portion front surface is displaced from the inner surface of the front wall of the upstanding channel shaped leg portion. The corner piece offset corner portion is positioned externally of the corner piece receiving openings in the adjacent duct connecting flange upstanding corner piece receiving portions. The corner piece corner section offset corner portion is displaced rearwardly relative to the corner piece front planar surface and above the duct connecting flange duct receiving portion bottom wall. The duct receiving leg portion is adapted to receive the duct end portion so that the corner edge portions of the duct end portion extends or projects beyond the corner piece offset corner portion into abutting relation with an external gasket means positioned on the corner piece corner section to provide a seal for the duct corner edge portion between adjacent duct connecting flange portions. The external gasket means is positioned in overlying relation with the duct connecting flange front wall and a portion of the corner piece corner section.

A deformable gasket, such as a flowing type gasket material, is positioned inside the flange portions and is operable to sealingly connect the duct end portion within the flange portions. The deformable gasket abuts the channel shaped leg portion front wall and the duct receiving leg portion bottom wall. The deformable gasket means is partially displaced inside the channel shaped leg portion and duct receiving leg portion when the duct end portion is inserted into the duct receiving leg portion. With this arrangement, the gasket material is operable to flow into sealing relation around the edge of the duct end portion in the duct receiving leg portion.

Preferably, the deformable gasket is partially displaced inside the channel shaped leg portion and the duct receiving leg portion when the duct end portion is inserted into the duct receiving leg portion to permit the edge of the duct end portion to move into abutting relation with the front wall of the channel shaped leg portion. The deformable gasket material has a viscosity that permits the material when displaced by movement of the duct end portion into the duct receiving leg portion to extrude out of the respective flange portions and onto the surface of the edge of the duct adjacent to the corner piece and onto the surface of the corner piece to provide an air-tight seal between the end of the duct adjacent the corner piece and the corner piece at the end of the flange portions.

Further, in accordance with the present invention an external gasket is positioned in overlying relation with the outer surface of the upstanding channel shaped leg portion front wall and the surface of the body of the corner section of the corner piece. The external gasket is penetrated by the corner edge portions of the duct end portion. The duct corner edge portions extend beyond the front surface of the corner piece flange portion to provide a seal between the outer surface of the duct edge and the front surface of the corner piece flange portion to prevent the flow of air therebetween.

Further, in accordance with the present invention the front wall of the upstanding channel shaped member has an inner surface arranged to receive in abutting relation the edge of the duct end portion. The outer surface of the corner piece flange portion is preferably curved or displaced rearwardly away from the front wall inner surface. With this arrangement the duct end portion is permitted to extend beyond the corner piece flange portion so that the duct edge can penetrate an external gasket positioned on the surface of the flange portions and corner pieces. This arrangement provides an effective corner seal for the duct joint assembly.

Another feature of the present invention is to provide a corner piece for connecting end portions of duct connecting flanges. The corner piece includes a corner section with a rearwardly displaced flange portion. The rearwardly displaced flange portion is arranged to permit the duct corner edge portions to project into abutting relation with an external gasket and seal the corner edge portions of the duct.

Another feature of the present invention includes a flange type duct joint assembly for connecting the end portions of generally rectangular ducts or duct sections which assemby includes a plurality of flange portions or duct connecting flanges. A plurality of angular corner pieces are provided for connecting adjacent flange portions to form a generally rectangular frame. The flange portions each have an upstanding channel shaped leg portion or upstanding corner piece receiving portion and a duct receiving portion or duct receiving leg portion. The upstanding channel shaped leg portion includes a front wall and a rear wall forming a corner piece receiving opening therebetween. The duct receiving leg portion includes a top wall and a bottom wall arranged to receive an end portion of a duct therebetween. The upstanding channel shaped leg portion front wall intersects the duct receiving leg bottom wall. The corner pieces each have a body portion or corner section and a pair of legs extending angularly therefrom. The corner piece corner section and the legs have a common front planar surface portion and a common rear planar surface portion. The pair of legs are arranged to extend into the corner piece receiving openings of the flange portion upstanding channel shaped leg portions. The corner piece body portion has a corner portion with a flange portion. The flange portion has an edge or edge portion. The flange portion edge is displaced from the upstanding channel shaped leg portion to permit the edge of the duct end portion to be positioned closely adjacent to the intersection of the upstanding channel shaped leg portion front wall and the duct receiving leg bottom wall. The corner piece flange portion is positioned externally of the corner piece receiving opening in the adjacent duct connecting flange upstanding corner piece receiving portion. The corner piece flange edge portion is displaced rearwardly relative to the corner piece front planar surface and above the duct connecting flange duct receiving portion bottom wall so that the duct section corner edge portion, between adjacent duct connecting flange portions, projects beyond the flange edge portion into abutting relation with an external gasket means positioned on the corner piece corner section to provide a seal for the duct corner edge portion between adjacent duct connecting flange portions. The external gasket means is positioned in overlying relation with the duct connecting flange front wall and a portion of the corner piece corner section. This sealing device or external gasket means is provided for maintaining an air-tight seal between the outer surface of the duct open end portion adjacent the corner piece and the edge of the corner piece flange portion so that the corner pieces of the generally rectangular frame sealingly engage the duct end portion to prevent air from within the duct flowing between the upper surface of the duct and the flange portion edges of the corner pieces.

Accordingly, the principal object of the present invention is to provide a flange type duct joint assembly to connect the end portions of generally rectangular ducts and a plurality of flange portions that are connected to adjacent flange portions by angular corner pieces that are arranged to receive an end portion of the duct and provide an air-tight seal between the corner edge portions of the duct end portion and the surface of the corner piece.

Another object of the present invention is to provide a seal arrangement between the end portion of a duct and angular corner pieces that connect a plurality of flange portions that form a frame for receiving the duct end portion to prevent flow of air from the duct between the duct end portion and the corner pieces of the frame.

A further object of this invention is to provide a corner piece that permits the duct corner edge portions to project into sealing relation with an external gasket.

An additional object of this invention is to provide a flange type duct joint assembly to connect end portions of generally rectangular duct sections that permits the duct section corner edge portions to project into sealing relation with an external gasket.

An additional object of this invention is to provide a flange type duct joint assembly to connect end portions of generally rectangular duct sections that permits the duct section corner edge portions to project into sealing relation with an external gasket.

These and other objects of the present invention will be more completely disclosed and described in the following specification, the accompanying drawings, and the appended claims.

DESCRIPTION OF THE PREFERRED EMBODIMENT

Figure 1:
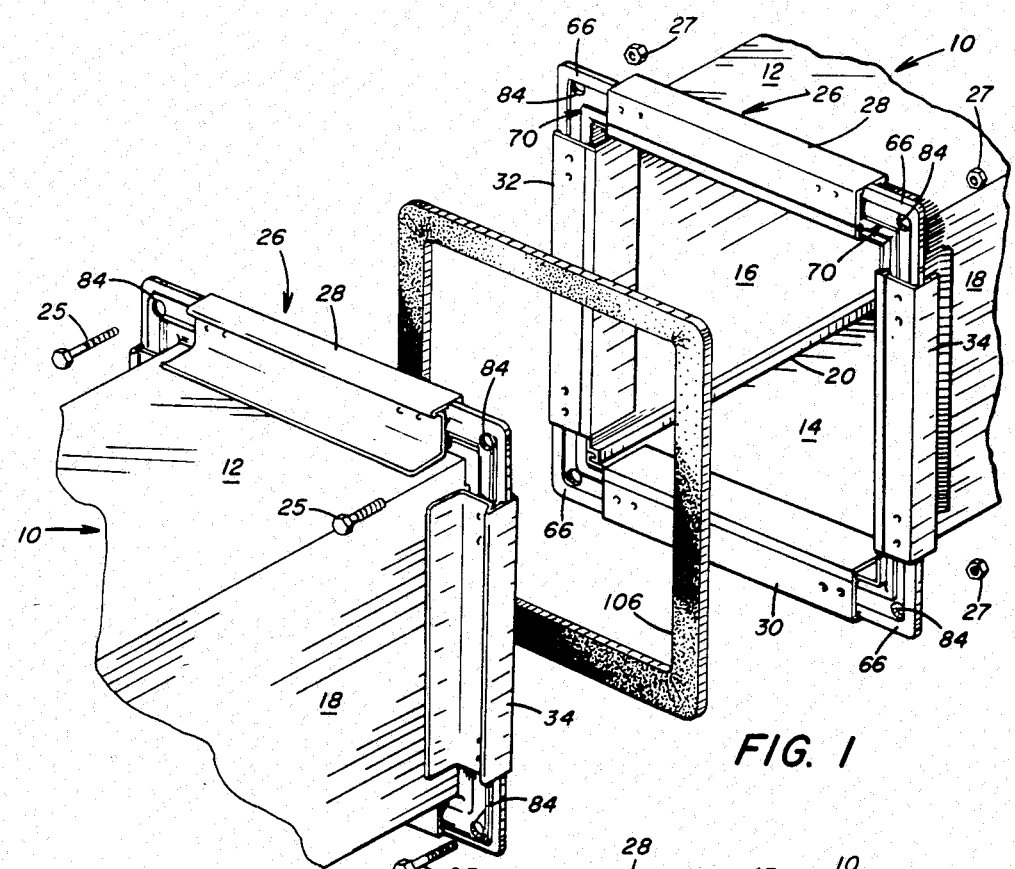
FIG. 1 is a fragmentary, exploded perspective view of a flange type duct joint assembly for connecting the end portions of a pair of ducts, illustrating a plurality of angular corner pieces for connecting adjacent flange portions to form a frame for receiving the end portions of the ducts.

Referring to the drawings and particularly to FIGS. 1–4, there is illustrated the end portion of a pair of duct sections generally designated by the numeral 10 in which each duct 10 has a generally rectangular configuration with an upper duct wall 12, a lower duct wall 14, and a pair of vertical duct sidewalls 16 and 18. The ducts 10 are formed in the rectangular configuration illustrated in FIG. 1 with a longitudinally extending sealed corner joint 20 between the lower duct wall 14 and the sidewall 16.

Figure 3:
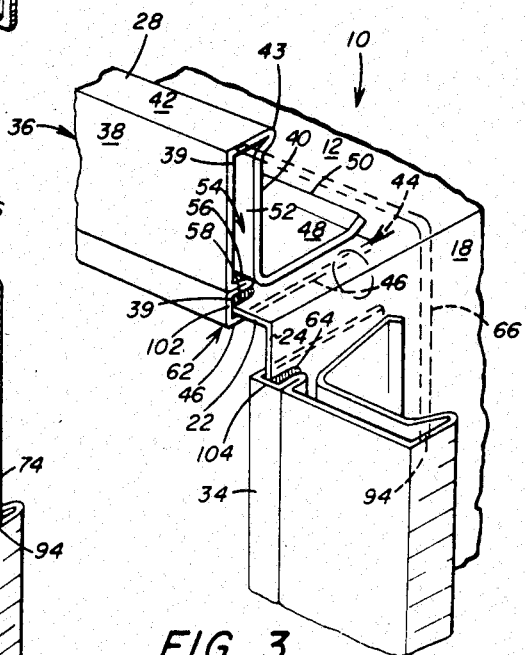
FIG. 3 is a perspective view of a corner of the end of a duct with the flange portions connected thereto and the corner piece connecting the adjacent flange portions.

As illustrated in FIG. 3, the duct upper wall 12 and the duct sidewall 18 terminates in end portions having corner portions with corner edge portions 22 and 24. It should be understood, although not shown, that the other duct walls 14 and 16 terminate in similar end portions so that the end portions of the duct 10 extend along a plane transverse to the longitudinal axis of the duct 10.

Each of the ducts 10 preferably is fabricated from galvanized sheet material and may have various thicknesses. For example, commercial grade 20 gauge duct has a thickness of between 0.906 and 1.106 millimeters. The galvanized surface of the duct walls also provides a relatively irregular surface so that the thickness of the sheet metal forming the duct 10 is not uniform along the duct end portions.

The end portions of the pair of ducts 10 are secured to each other by a pair of frame members generally designated by the numeral 26. The frame members 26 are similar in construction and are secured to the ends of adjacent duct sections and are connected to each other by bolts 25 and nuts 27, shown in FIG. 1 as will be described later in greater detail. Each frame 26 is formed by a plurality of duct connecting flanges that extend outwardly from the duct wall end portion and include an upper flange portion 28, a lower flange portion 30 and a pair of side flange portions 32 and 34. The configuration of the flange portions 28-34 are identical and are preferably cut to a preselected length from an elongated sheet metal strip that has been roll formed into the flange configuration illustrated in the drawings. Throughout the specification, the flange portions 28 and 34 and the connections therebetween will be described in detail; however, it should be understood that the other flange portions are similarly connected to the duct end portions and to each other.

The flange portion 28 is illustrated in detail in FIGS. 2, 3, 4, 8 and 9. The flange 28 has an upstanding channel shaped corner piece receiving leg portion or upstanding corner piece receiving portion generally designated by the numeral 36 with a front wall 38 connected to a rear wall 40 by a generally horizontal top wall 42. A shoulder 43 is formed between the walls 40 and 42 and is adapted to receive a longitudinal clip 41 illustrated in FIG. 9. Extending laterally at substantially a right angle from the upstanding channel shaped leg portion 36 is a duct receiving leg portion or duct receiving portion 44 generally designated by the numeral 44 which has a bottom wall 46 and a top wall 48. The top wall 48 has an upturned lip portion 50 to permit the end wall of the duct to slide between the respective walls 46 and 48 so that the duct end wall is frictionally engaged between adjacent surfaces of the flange walls 46 and 48.

In forming the profile of the flange portions, the walls 38 and 40 of upstanding leg 36 are spaced from each other by the top wall 42 to form a longitudinally extending cavity or corner piece receiving opening 52 for receiving the legs of angular corner pieces which will be described later. The outer vertical wall 38 has an inturned rebent portion generally designated by the numeral 54 that extends inwardly into the opening 52 closely adjacent the inner surface of vertical wall 40. As illustrated in greater detail in FIG. 8, the inturned portion 54 has a tear drop configuration in side elevation with an upper leg 56 and a lower leg 58. The legs 56 and 58 extend angularly from the vertical wall 38 and form an acute angle therewith. The lower leg 58 of inturned portion 54 is spaced upwardly from and extends toward the inner surface 60 of the lower horizontal wall 46 to form therebetween a pocket generally designated by the numeral 62 as seen in FIG. 3.

Figure 2:
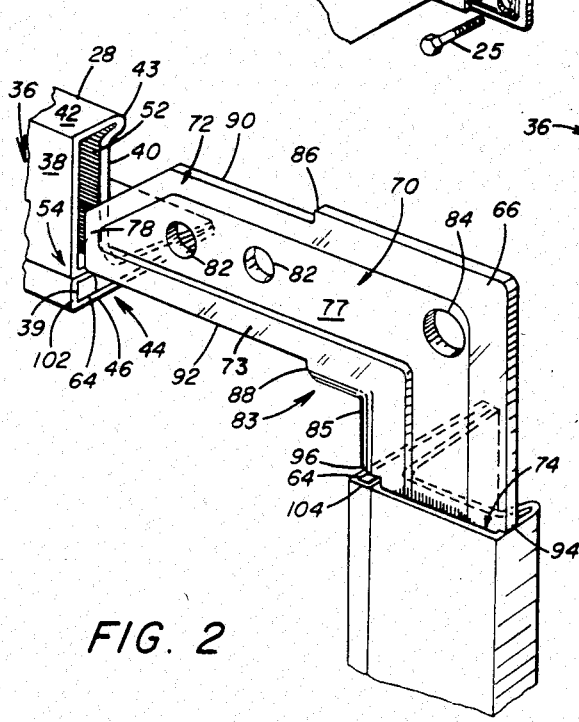
FIG. 2 is an enlarged perspective view of an angular corner piece and adjacent flange portions.

Suitable gasket material 64, as illustrated in FIGS. 2 and 3, is positioned in the pocket 62 and is maintained therein by the angular relation of lower leg 58 of inturned portion 54 and the bottom horizontal wall 46 and the portion of the inner surface 39 of front wall 38 below the inturned portion 54. The gasket material 64 has a viscosity that permits the material to flow into position by application from a nozzle into the pocket 62. An example material suitable for use as the gasket material 64 is a polymeric material, such as Servaseal 5511 sold by Service Adhesives, Inc. of Maywood, Ill.

Preferably the gasket material 64 remains flowable for a substantial period of time at least during the assembly of the duct joint. With this arrangement the end portion of the duct when inserted into the duct receiving leg portion 44 partially displaces the gasket material within the pocket 62. The gasket material 64 sealingly connects the duct end portion to the respective flanges. Thus, an air-tight seal is formed around the adjacent metal surfaces as will be explained hereinafter in greater detail.

Figure 8:
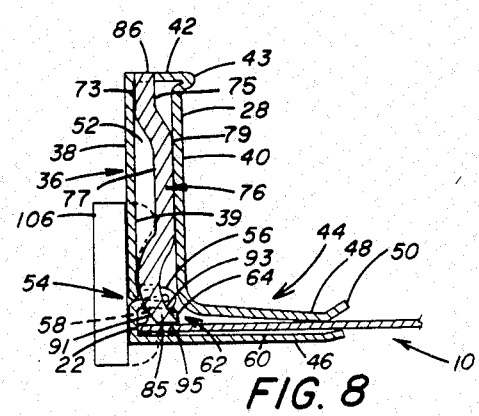
FIG. 8 is a fragmentary sectional view of the end portion of the duct abutting the front wall of an upstanding channel shaped leg portion of the flange and penetrating the gasket member positioned on the flange and the corner piece, illustrating the flange portion of the corner piece curved or displaced rearwardly from the front wall of the channel shaped leg portion.

The vertical rear wall 40 of the upstanding channel shaped leg portion 36 as seen in FIGS. 3 and 8 extends generally parallel to the vertical front wall 38 to a location where the inner surface of the rear wall 40 is slightly below the lower leg 58 of inturned portion 54. The rear wall 40 at that location is bent to form a juncture with the top wall 48 of the duct receiving leg portion 44. The top wall 48 is inclined to and extends into abutting relation with the upper surface of the lower wall 46 which, in turn, is bent upwardly slightly at its end portion to receive the duct end wall and frictionally engage the duct end wall between adjacent surfaces of walls 46 and 48. The above described configuration permits duct walls of different thicknesses to be utilized and maintained in frictional engagement between the adjacent surfaces of the respective walls 46 and 48.

Figure 4:
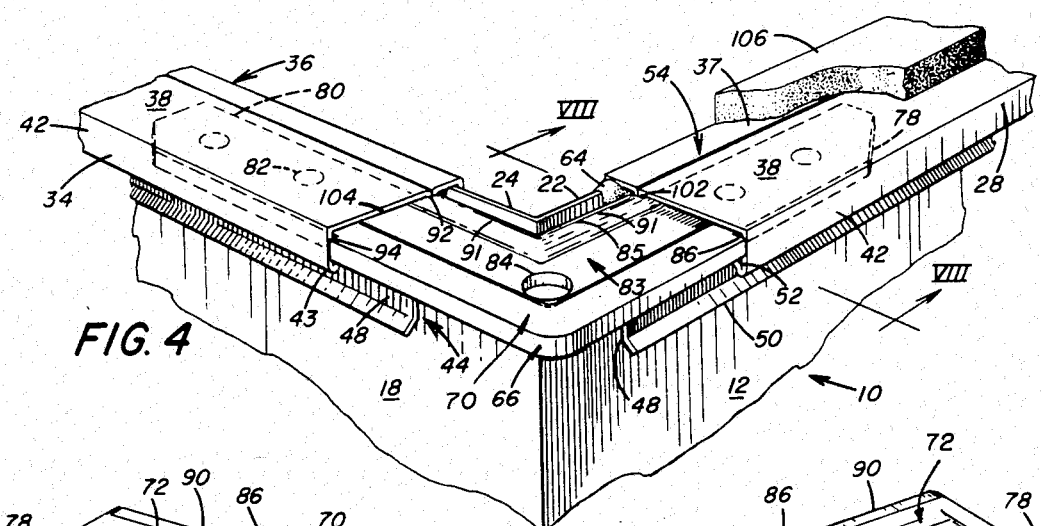
FIG. 4 is a fragmentary perspective view of a corner of the end portion of a duct sealingly connected to a pair of adjacent flanges connected by a corner piece, illustrating the edge of the duct extending beyond a flange portion of the corner piece. A deformable gasket material in the flanges is shown extruded from the end of one flange but is omitted from the end of the other flange for purposes of illustration only to more clearly show the relationship between the end of the flange, the flange of the corner piece, and the end of the duct.

The vertical dimension of the pocket 62 is not critical because of the gasket material 64 positioned therein. The vertical dimension of pocket 62 may be such that it is arranged to receive duct end walls of different thicknesses and the flange portions 28-34 may thus be utilized for joint assemblies on ducts of different wall thicknesses. It is preferred, as illustrated in FIG. 3, that the duct walls end portions be inserted into the pockets 62 and through the gasket material 64 until the edges of the duct wall end portions abut the inner surfaces 39 of the vertical walls 38. It should be understood that a seal is obtained when the edge of the duct wall end portions penetrates the gasket material 64. The gasket material 64 is operable to be displaced and flow out of the pocket 62 at the end of the respective flanges to thereby form a seal around the end of the duct at the intersection of walls 38 and 46 adjacent corner piece 66, as illustrated in FIG. 4.

Figure 5:
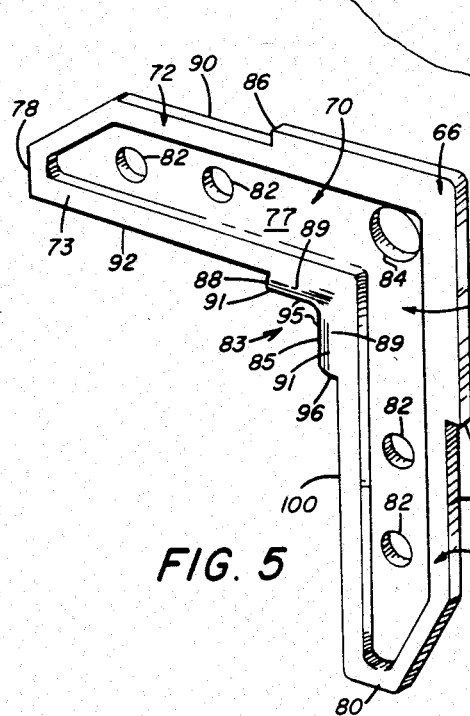
FIG. 5 is a perspective view of an angular corner piece, illustrating a rearwardly displaced or curved flange portion extending from the inner corner of the corner piece.
Figure 6:
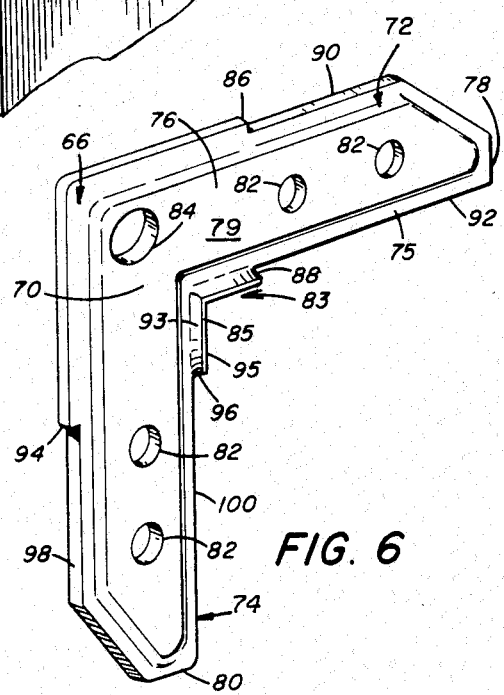
FIG. 6 is a perspective view of the opposite face of the angular corner piece shown in FIG. 5, illustrating the configuration of the rearwardly displaced or curved flange portion of the corner piece.

Angular corner pieces 66, as illustrated in FIGS. 1-4 and in greater detail in FIGS. 5-7 and 10 and 11, have a generally planar configuration. Each corner piece 66 has a corner section or body portion 70 and legs 72 and 74 extending angularly therefrom in substantially the same plane as the corner section 70. The legs 72 and 74 are arranged to extend into the openings 52 of flange portions 28 and 34 while the corner section 70 remains outside of the flange portion openings 52, as illustrated in FIGS. 1-4. The corner piece 66 has a front planar surface 73 and a rear planar surface 75. The front planar surface 73 within the flange portion openings 52 is arranged to abut the inner surface 39 of the frame front wall 38. Also, as illustrated in FIGS. 5 and 6, for example, corner piece corner section 70 has a common front planar surface portion and a common rear planar surface portion with leg 72 and corner piece corner section 70 has a common front planar surface portion and a common rear planar surface portion with leg 74. The corner piece 66 has an elongated embossed portion 76, as illustrated in FIGS. 5, 6, 10 and 11 which extends from a location adjacent the end portion 78 of the leg 72 to the corner section 70 and continues through the corner section 70 along the other leg to a location adjacent the end portion 80 of leg 74. The embossed portion 76 has a front concave surface 77 and a rear convex surface 79. The convex surface 79 within the flange portion openings abuts the front surface of the flange rear wall 40. With this arrangement, the legs 72 and 74 have a front planar surface 73 that abuts the rear surface 39 of flange front wall 38 and a convex surface 79 that abuts the inner surface of rear wall 40.

Figure 7:
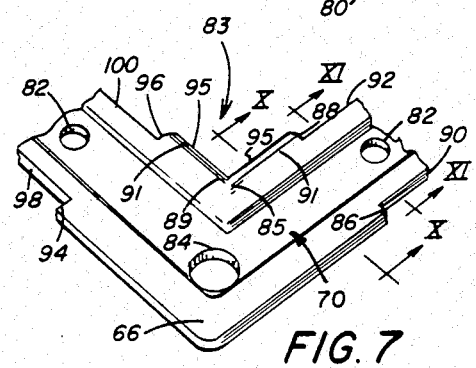
FIG. 7 is a fragmentary perspective view of a corner piece, illustrating the rearwardly displaced or curved flange portion.
Figure 10:
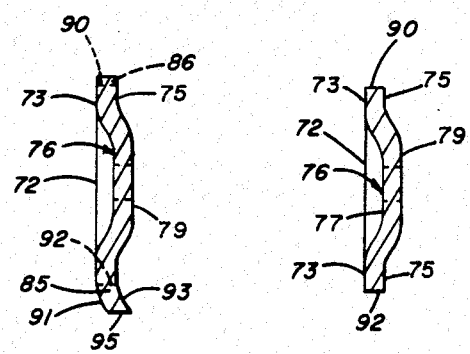
FIG. 10 is a sectional view of a corner piece taken along the lines X—X of FIG. 7, illustrating the configuration of a leg of the corner piece and the curved or displaced flange portion of the corner piece.

The legs 72 and 74 have apertures 82 therein to permit dimpling of the frame portions after assembly of the frame member 26. The corner section 70 has a bolt aperture 84 arranged to receive a connecting bolt. The corner piece 66 has shoulders 86 and 88 adjacent the upper and lower edges 90 and 92 of leg 72 and shoulders 94 and 96 adjacent the upper and lower edges 98 and 100 of leg 74, defining the boundary of the corner piece corner section 70 relative to legs 72 and 74. The shoulders 86, 88, 94 and 96 serve as top means and are operable as stops arranged to abut ends 102 and 104 of flange portions 28 and 34, as illustrated in FIG. 3 to limit the length the legs 72 and 74 extend into the flange portions 28 and 34. The corner piece corner section 70 has a lower corner portion generally designated by the numeral 83 having an L-shaped flange or offset portion 85, as illustrated in FIGS. 7 and 10. The flange portion 85 has an arcuate or offset portion 89 which is dispersed or curved rearwardly in a direction away from the corner piece front planar surface 73 toward the rear planar surface 75. The flange arcuate portion 89, as illustrated in FIGS. 5-7, has a front surface 91, a rear surface 93 and an L-shaped end or edge portion 95 which is displaced rearwardly from the front planar surface 73. The edge portion 95 extends from the shoulder 88 to the shoulder 96. The flange 85 is thus bounded by the shoulders 88 and 96 and the L-shaped edge portion 95.

With the above described arrangement of the corner piece 66, the leg portions 72 and 74 are positioned in the openings 52 of flange portions 28 and 34. The top walls 42 of the upstanding channel shaped leg portions 36 serve as a stop means and abut shoulders 86 and 94 to prevent the corner section 70 of the corner piece 66 from extending into the longitudinal openings 52. With the corner piece 66 in this position as illustrated in FIG. 8, the front surface 91 and the L-shaped edge 95 of the rearwardly displaced or curved flange or offset portion 85 are displaced rearwardly from the inner surface 39 of the front wall 38 and spaced above the upper surface of horizontal bottom wall 46 so as to provide clearance for the corner edge portions 22 and 24 of the duct end portion to extend beyond the edge portion 95 and the surface 91 of flange portion 85 permitting the duct end portion to be positioned closely adjacent to or in abutting relation with the inner surface 39 of the flange front wall 38. With this arrangement an air-tight seal is provided around the corner edge portions 22 and 24 adjacent the flanges 28 and 34 and by the penetration of the duct edge portions 22 and 24 into a gasket 106, positioned on the corner piece corner section 70 as illustrated in FIG. 4 and as will be explained later in greater detail.

Figure 11:
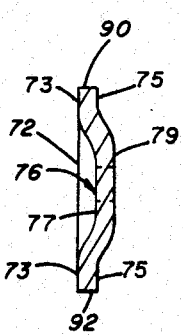
FIG. 11 is a sectional view of a corner piece taken along lines XI—XI of FIG. 7, illustrating the configuration of a corner piece.

As illustrated in FIG. 11, the leg 72 of corner piece 66 has a planar surface 73 and a concave surface 77 and upper and lower surface edges 90 and 92. When the leg 72 is positioned in the opening 52 of flange portion 28, as illustrated in FIGS. 3 and 8, the upper edge 90 of leg 72 abuts the under surface of the horizontal wall 42 and the lower edge 92 abuts upper leg 56 of the inturned portion 54. The rear convex surface 79 of the embossment 76 abuts the inner surface of the rear wall 40 while the planar front surface 73 of the leg abuts the inner surface 39 of the front wall 38. With this arrangement, the leg 72 of the corner piece 66 abuts the surfaces of both the front wall 38 and rear wall 40 in the cavity 52 and the upper edge 90 abuts the horizontal wall 42 while the lower edge 92 abuts the surface of the inturned portion upper leg 56. This provides a rigid, sturdy connection between the corner piece leg portion and the flange portion.

As above described, the shoulders 88 and 96 are arranged to abut the ends 102 and 104 of the flange portions 28 and 34 so tha the lower corner portion 83 of the corner piece corner section 70 does not extend into the longitudinal openings 52 of the respective flange portions. Therefore, the rearwardly curved or displaced flange portion 85 of the corner portion 83 is in juxtaposition with the flange portion ends 102 and 104. Further, as illustrated in FIGS. 4 and 8 the front surface 91 of the arcuate flange portion 85 along the edge 95 is spaced rearwardly from the inner surface 39 of the flange portion front wall 38. The longitudinal edge 95 is also spaced above the horizontal inner surface 60 of the flange bottom wall 46. With this arrangement, clearance is provided between the L-shaped edge 95 of the corner piece flange portion 85 and the bottom wall upper surface 60 to permit the duct end portions to pass between the duct receiving walls 46 and 48 into abutting relation with the inner surface 39 of the flange front wall 38 and the corner edge portions 22 and 24 to pass beyond the longitudinal edge 95 and flange surface 91. With this arrangement, as illustrated in FIG. 4, the end portions of the duct 10 extend into the flange portions of the frame member 26 with the exception of the L-shaped corner portions of the duct. The exposed portions of the duct corner edge portions 22 and 24 are not embedded in the mastic seal and it is essential that a seal be provided along these exposed corner edge portions 22 and 24 of the duct. Thus, the plane corner edges 22 and 24 of the duct end portions extend beyond edge portion 95 of the corner piece lower corner portion flange 85 into the surface of the gasket 106.

The frame members 26 are formed by first cutting preselected lengths of the strips having preformed flange portion profiles. For example, frame portions 28, 30, 32 and 34 are cut from a strip of the flange shaped profile. Four corner pieces 66 have the leg portions 72 and 74 inserted in the openings 52 in the respective upstanding channel shaped leg portion 36 so that they extend into the openings 52 their entire length with the shoulders 86, 88, 94 and 96 abutting the edges of the respective flange portions. With the corner pieces 66 secured in the openings, the generally rectangular frame 26 is then secured to the end of the duct 10 by passing the duct walls 12-18 between the legs 46 and 48 of the duct receiving leg portion 44. The end portions of the respective duct walls 12-18 are urged into the flange portions 28-34 until the duct end wall portions, penetrate the gasket material 64 and abut the inner surfaces 39 of the frame portion vertically extending walls 38.

It will be apparent that due to variaions in the thickness of the duct end wall portions, the duct end portions and may be spaced slightly from the front wall 38 but closely adjacent thereto to the extent that the edge of the duct displaces the gasket material 64 in the pocket 62. Consequently, the flowing type gasket material extrudes outwardly around the upper and lower surfaces of the duct wall end portions to seal the end portion of the duct wall in the respective pocket 62 of the flange portion. Further, a portion of the gasket material 64 extrudes longitudinally, as illustrated in FIG. 4, beyond the ends of the flange portions adjacent the corner piece corner portion 83. The gasket material 64 flows between a respective corner piece shoulder portion, for example shoulder 88, and the adjacent flange end portions and onto the flange portion 85. Further when the gasket material 64 is extruded from the open end of the flange it flows into the space between the upper surface of the end of the duct wall and the edge 95 of the corner piece flange portion 85. This arrangement provides an effective airtight seal between the flange and the duct and the corner piece and the duct within the flange. For purposes of illustration only the gasket material 64 has been omitted from flange portion 34 shown in FIG. 4.

Figure 9:
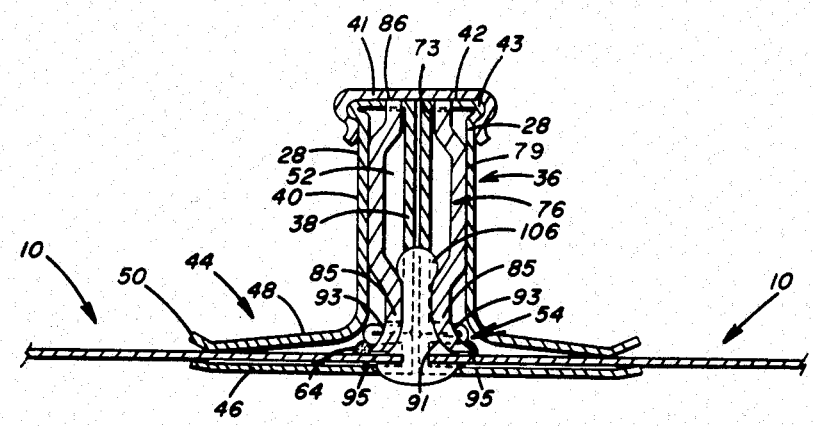
FIG. 9 is a fragmentary sectional view of the end portions of a pair of ducts connected by the duct joint assembly of the present invention, illustrating the flanges secured to the ducts with the flanges abutting a gasket therebetween.

As illustrated in FIG. 9, pairs of ducts are positioned with the flange members in abutting relation with each other. A suitable relatively thin gasket member 106 such as neoprene, polyethylene or the like, is positioned between the upstanding channel shaped leg portion front walls 38 on the outer surface 37 thereof and between the surfaces of the corner pieces 66. Preferably, the gasket member 106 is formed or shaped to meet the dimensions of the duct end wall and the respective frame members 26. Bolts 25 are inserted through the respective apertures 84, and nuts 27 are threadedly secured to the bolts 25 to thus secure the corner pieces 66 to each other and, in turn, secure the respective frame members 26 to each other with the ducts 10 secured thereto.

With this arrangement, the frame members 26 provide a joint assembly for securing the duct members 10 to each other and to form an air-tight seal therebetween. The configuration of the flange portions permits duct members having walls of different thicknesses to be utilized with the frame portions having the same dimension. The edges of the duct walls extend into the flowing type gasket material 64 in the longitudinal openings 52 to provide an air-tight seal between the undersurface of the duct wall and the uppersurface of the duct receiving leg portion and further around the duct end wall between the uppersurface of the duct wall and the innersurface 39 of front wall 38. In addition the flowing type gasket material 64 is effective to form an air-tight seal where the surfaces of duct walls or the walls of the frame portions are irregular due to the coating applied to the surface during the galvanizing operation.

Further it will be apparent from the present invention that by rearwardly curving or displacing the corner piece flange portions 85 that form the corner piece corner portion 83, the duct corner edge portions 22 and 24 are operable to extend into or penetrate the gasket member 106 which is positioned between the upstanding channel shaped leg portions 36 in overlying relation with the corner piece lower corner portions 83. In this manner air from within the duct is prevented from flowing around the duct end wall and between the upper surface of the duct and the surface of the corner piece flange edge 95.

According to the provisions of the patent statutes I have explained the principle preferred construction and mode of operation of my invention and have illustrated and described what I now consider to represent its best embodiments. However, it should be understood that, within the scope of the appended claims, the invention may be practiced otherwise than as specifically illustrated and described.

I claim:

1. A flange type duct joint assembly to connect end portions of generally rectangular duct sections comprising, duct sections having a generally rectangular configuration with end portions, said duct section end portions having corner portions with corner edge portions, a plurality of duct connecting flanges, said duct connecting flanges each having an upstanding corner piece receiving portion with a front wall, a rear wall and a corner piece receiving opening therebetween, said duct connecting flanges each having a duct receiving portion with a top wall and a bottom wall, said duct connecting flange upstanding corner piece receiving portion front wall intersecting said duct receiving portion bottom wall, a plurality of corner pieces for connecting adjacent duct connecting flanges, said corner pieces each having a corner section and a pair of legs extending angularly from said corner section, said corner piece corner section and said legs having a common front planar surface portion and a common rear planar surface portion, said corner piece legs arranged to extend into said duct connecting flange upstanding corner piece receiving opening to connect adjacent duct connecting flanges and form a generally rectangular frame, said duct section end portions arranged to extend into said duct connecting flange duct receiving portions between said top wall and said bottom wall and into substantially abutting relation with said duct connecting flange upstanding corner piece receiving portion front wall, external gasket means positioned in overlying relation with said duct connecting flange front wall and a portion of said corner piece corner section, said corner piece corner section having an offset corner portion displaced rearwardly from said front planar surface, said corner piece offset corner portion positioned externally of said corner piece receiving openings in said adjacent duct connecting flange upstanding corner piece receiving portions, and said corner piece corner section offset corner portion displaced rearwardly relative to said corner piece front planar surface and above said duct connecting flange duct receiving portion bottom wall so that said duct section corner edge portion, between adjacent duct connecting flange portions, projects beyond said corner piece offset portion into abutting relation with said external gasket means positioned on said corner piece corner section to provide a seal for said duct corner edge portion between adjacent duct connecting flange portions.

2. A flange type duct joint assembly as set forth in claim 1 in which, said duct connecting flanges each having end portions and an inturned front wall portion, said corner piece corner section offset corner portion having a generally L-shaped configuration with an edge portion positioned adjacent each of said legs, said offset corner portion edge portions abutting said duct connecting flange inturned front wall portion to limit the length of said corner piece extending into said end portions of said respective adjacent duct connecting flange upstanding corner piece receiving portions.

3. A flange type duct joint assembly as set forth in claim 1 in which, said corner piece has an embossment extending along said pair of legs with a front concave surface along said front planar surface portion and a rear convex surface along said rear planar surface portion, said leg front planar surface portion abutting said upstanding corner piece receiving portion front wall and said convex surface abutting said upstanding corner receiving portion rear wall.

4. A flange type duct joint assembly to connect end portions of generally rectangular duct sections comprising, duct sections having a generally rectangular configuration with end portions, said duct section end portions having corner portions with corner edge portions, a plurality of duct connecting flanges, said duct connecting flanges each having an upstanding corner piece receiving portion with a front wall, a rear wall and a corner piece receiving opening therebetween, said duct connecting flanges each having a duct receiving portion with a top wall and a bottom wall, said duct connecting flange upstanding corner piece receiving portion front wall intersecting said duct receiving portion bottom wall, a plurality of corner pieces for connecting adjacent duct connecting flanges, said corner pieces each having a corner section and a pair of legs extending angularly from said corner section, said corner piece corner section and said legs having a common front planar surface portion and a common rear planar surface portion, said corner piece legs arranged to extend into said duct connecting flange upstanding corner piece receiving opening to connect adjacent duct connecting flanges and form a generally rectangular frame, said duct section end portions arranged to extend into said duct connecting flange duct receiving portions between said top wall and said bottom wall and into substantially abutting relation with said duct connecting flange upstanding corner piece receiving portion front wall, external gasket means positioned in overlying relation with said duct connecting flange front wall and a portion of said corner piece corner section, said corner piece corner section having a corner portion, a flange portion extending from said corner section corner portion, said flange having an edge portion displaced rearwardly from said corner piece front planar surface portion, said corner piece flange portion positioned externally of said corner piece receiving opening in said adjacent duct connecting flange upstanding corner piece receiving portion, and said corner piece flange edge portion displaced rearwardly relative to said corner piece front planar surface and above said duct connecting flange duct receiving portion bottom wall so that said duct section corner edge portion, between adjacent duct connecting flange portions, projects beyond said flange edge portion into abutting relation with said external gasket means positioned on said corner piece corner section to provide a seal for said duct corner edge portion between adjacent duct connecting flange portions.

5. A flange type duct joint assembly as set forth in claim 4 in which, said corner piece corner section flange portion having a generally L-shaped configuration.

6. A duct joint assembly for connecting the end portions of generally rectangular ducts comprising, a pair of duct sections having a generally rectangular configuration with end portions, said duct section end portions having corner portions with corner edge portions, a plurality of duct connecting flanges, said duct connecting flanges each having an upstanding corner piece receiving portion with a front wall, a rear wall and a corner piece receiving opening therebetween, said duct connecting flanges each having a duct receiving portion with a top wall and a bottom wall, said duct connecting flange upstanding corner piece receiving portion front wall intersecting said duct receiving portion bottom wall, a plurality of corner pieces for connecting adjacent duct connecting flanges, said corner pieces each having a corner section and a pair of legs extending angularly from said corner section, said corner piece corner section and said legs having a common front planar surface portion and a common rear planar surface portion, said corner piece legs arranged to extend into said duct connecting flange upstanding corner piece receiving opening to connect adjacent duct connecting flanges and form a generally rectangular frame, said duct section end portions arranged to extend into said duct connecting flange duct receiving portions between said top wall and said bottom wall and into substantially abutting relation with said duct connecting flange upstanding corner piece receiving portion front wall, said corner piece corner section having an offset corner portion displaced rearwardly from said front planar surface, said corner piece offset portion positioned externally of said corner piece receiving openings in said adjacent duct connecting flange upstanding corner piece receiving portions, pairs of said duct sections with said generally rectangular frames on said duct end portions positioned with said duct connecting flange corner piece receiving portion front walls in adjacent relation to each other, a gasket member positioned between said duct connecting flange portion corner piece receiving front walls and said corner piece corner sections, said corner piece corner section offset corner portions displaced rearwardly relative to said corner piece front planar surface and above said duct connecting flange duct receiving portion bottom wall so that said adjacent duct section corner edge portions, between adjacent duct connecting flange portions, project beyond said corner piece offset portions to a location adjacent said front wall of said duct connecting flange upstanding corner piece receiving portions, and means for securing said rectangular frames to each other to connect said duct sections and urge said duct section corner edge portions into said gasket member between adjacent duct connecting flange end portions to provide an air-tight seal at the corner portions of said connected duct sections and urge said upstanding corner piece receiving portion front walls against said gasket member to form an air-tight seal between said rectangualr frames.

7. A duct joint assembly for connecting the end portions of generally rectangular ducts comprising, a pair of duct sections having a generally rectangular configuration with end portions, said duct section end portions having corner portions with corner edge portions, a plurality of duct connecting flanges, said duct connecting flanges each having an upstanding corner piece receiving portion with a front wall, a rear wall and a corner piece receiving opening therebetween, said duct connecting flanges each having a duct receiving portion with a top wall and a bottom wall, said duct connecting flange upstanding corner piece receiving portion front wall intersecting said duct receiving portion bottom wall, a plurality of corner pieces for connecting adjacent duct connecting flanges, said corner pieces each having a corner section and a pair of legs extending angularly from said corner section, said corner piece corner section and said legs having a common front planar surface portion and a common rear planar surface portion, said corner piece legs arranged to extend into said duct connecting flange upstanding corner piece receiving opening to connect adjacent duct connecting flanges and form a generally rectangular frame, said duct section end portions arranged to extend into said duct connecting flange duct receiving portions between said top wall and said bottom wall and into substantially abutting relation with said duct connecting flange upstanding corner piece receiving portion front wall, said corner piece corner section having a corner portion, a flange portion extending from said corner section corner portion, said flange portion having an end portion displaced rearwardly from said corner piece front planar surface, said corner piece flange portion positioned externally of said corner piece receiving openings in said adjacent duct connecting flange upstanding corner piece receiving portions, pairs of said duct sections with said generally rectangular frames on said duct end portions with said duct connecting flange corner piece receiving portion front walls in adjacent relation to each other, a gasket member positioned between said duct connecting flange corner piece receiving portion front walls and said corner piece corner sections, said corner piece flange end portions displaced rearwardly relative to said corner piece front planar surface and above said duct connecting flange duct receiving portion bottom wall so that said adjacent duct section corner edge portions, between adjacent duct connecting flange portions, projects beyond said corner piece flange end portion to a location adjacent said front wall of said duct connecting flange, and means for securing said rectangular frames to each other to connect said duct sections and urge said duct section corner edge portions into said gasket member, between adjacent duct connecting flange portions, to provide an air-tight seal at the corner portions of said connected duct sections and urge said upstanding corner piece receiving portion front walls against said gasket member to form an air-tight seal between said rectangular frames.

* * * * *

US004508376B1

REEXAMINATION CERTIFICATE (3186th)

United States Patent [19]
Arnoldt

[11] B1 4,508,376
[45] Certificate Issued May 13, 1997

[54] FLANGE TYPE DUCT JOINT ASSEMBLY AND SEAL ARRANGEMENT THEREFOR

[75] Inventor: Peter J. Arnoldt, Puce, Canada

[73] Assignee: Ductmate Industries, Inc., Pittsburgh, Pa.

Reexamination Request:
No. 90/004,368, Sep. 16, 1996

Reexamination Certificate for:
Patent No.: 4,508,376
Issued: Apr. 2, 1985
Appl. No.: 327,934
Filed: Dec. 7, 1981

Related U.S. Application Data

[63] Continuation of Ser. No. 933,179, Aug. 14, 1978, which is a continuation-in-part of Ser. No. 872,644, Jan. 26, 1978, Pat. No. 4,218,079.

[51] Int. Cl.$^6$ .............................. F16L 23/00; F16L 23/04
[52] U.S. Cl. ............................................. 285/363; 285/424
[58] Field of Search ..................................... 285/363, 364, 285/405, 424

[56] References Cited

U.S. PATENT DOCUMENTS

| | | |
|---|---|---|
| 565,499 | 8/1896 | Pattison ................................. 285/424 |
| 939,001 | 11/1909 | Forster et al. . |
| 1,035,810 | 8/1912 | Osborne . |
| 1,812,319 | 6/1931 | Brumfield . |
| 3,199,901 | 8/1965 | Jeppsson ............................... 285/364 |
| 3,246,918 | 4/1966 | Burghart ............................ 285/424 X |
| 3,630,549 | 12/1971 | Grimm ................................ 285/424 X |
| 3,695,636 | 10/1972 | Groves ............................... 285/424 X |
| 3,712,650 | 1/1973 | Mez ..................................... 285/424 X |

(List continued on next page.)

FOREIGN PATENT DOCUMENTS

| | | | |
|---|---|---|---|
| 1363255 | 5/1964 | France ................................. 285/424 |
| 1212356 | 3/1966 | Germany ............................. 285/364 |
| 2138966 | 2/1973 | Germany ............................. 285/424 |

(List continued on next page.)

OTHER PUBLICATIONS

Smitka Advertisement, "Now You Can Reduce Your In-Place Cost of Duct Connections By 59%".
Schmolz & Bickenbach Catalog.
Technischer & Hinweis Drawings.
Lusfuhrung von Kanalen mit SBM-Eshmon Drawing.

Primary Examiner—Dave W. Arola

[57] ABSTRACT

A joint assembly for connecting the ends of a pair of generally rectangular sheet metal duct sections includes a pair of frame members secured to each other and connected to the respective duct end sections. The frame members each include four flange portions. Each flange portion has an upstanding channel shaped leg portion and an angularly extending duct receiving leg portion. A corner piece connects adjacent flange portions and extends into the channel portions of the upstanding leg portions to form the generally rectangular frame. The end portions of the ducts are inserted into longitudinal openings of the duct receiving leg portions. A flowing type gasket material is positioned longitudinally in the flanges in a longitudinal pocket formed between an inturned rebent portion and the upper horizontal surface of the bottom wall of the duct receiving leg portion. The end of each duct wall partially displaces the gasket material so that the gasket material extrudes outwardly around the upper and lower surfaces of the duct wall and between the ends of the flange portion and the corner piece. The surface of the corner piece flange portion is displaced from the front vertical wall of the upstanding channel shaped leg portion so that the edge of the duct extends beyond the flange portion and penetrates an outside gasket member positioned on the upstanding channel shaped leg portion and the corner piece. This provides an effective seal to prevent air within the duct from flowing around the end of the duct and between the outer surface of the duct and the surface of the flange portion of the corner piece.

U.S. PATENT DOCUMENTS

| | | | |
|---|---|---|---|
| 3,923,326 | 12/1975 | Mez | 285/363 |
| 4,094,520 | 6/1978 | Rockaway et al. | |
| 4,123,094 | 10/1978 | Smitka | 285/424 |
| 4,218,079 | 8/1980 | Arnoldt | 285/424 |
| 4,288,115 | 9/1981 | Sullivan | 285/363 |

FOREIGN PATENT DOCUMENTS

| | | | |
|---|---|---|---|
| 2353625 | 11/1973 | Germany . | |
| 2221312 | 11/1973 | Germany | 285/424 |
| 7401814 | 5/1974 | Germany . | |
| 2258680 | 6/1974 | Germany | 285/424 |
| 2313425 | 9/1974 | Germany | 285/424 |
| 2353325 | 3/1975 | Germany | 285/424 |
| 2434160 | 1/1976 | Germany | 285/424 |
| 2034005 | 5/1976 | Germany | 285/424 |
| 2501611 | 7/1976 | Germany | 285/424 |
| 2556167 | 6/1977 | Germany | 285/424 |
| 2627515 | 12/1977 | Germany | 285/424 |
| 1294859 | 11/1972 | United Kingdom . | |
| 1346366 | 2/1974 | United Kingdom . | |
| 1407796 | 9/1975 | United Kingdom . | |

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–7 is confirmed.

* * * * *